May 6, 1941.  R. C. PORTER  2,240,912
POWER TRANSMISSION
Filed Sept. 25, 1939   4 Sheets-Sheet 4
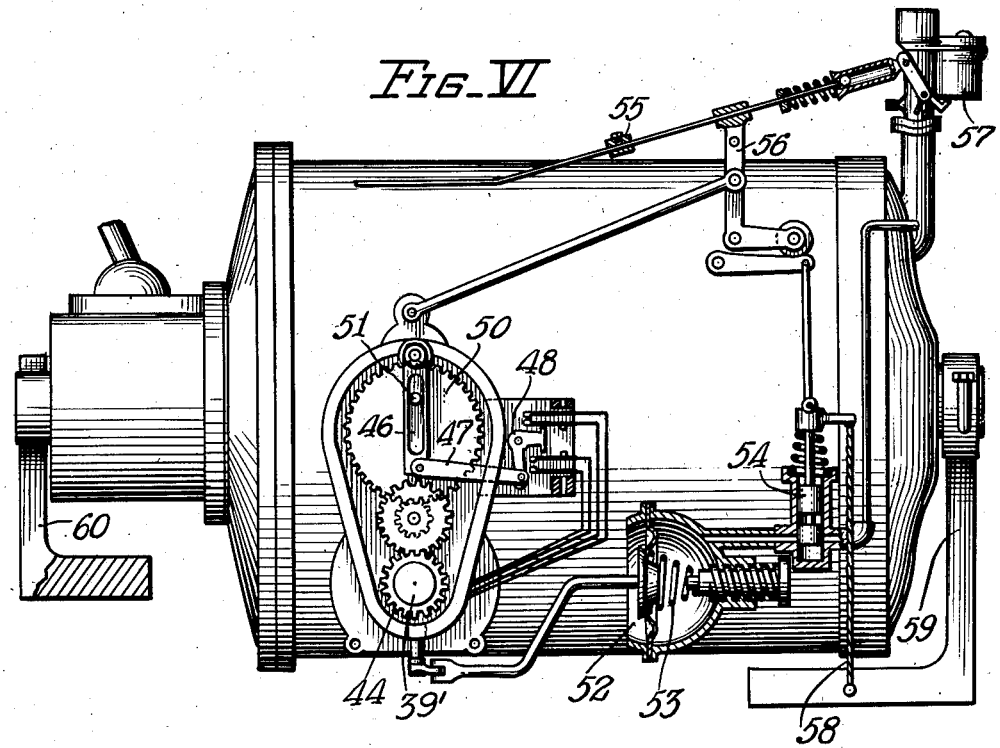
Fig. VI
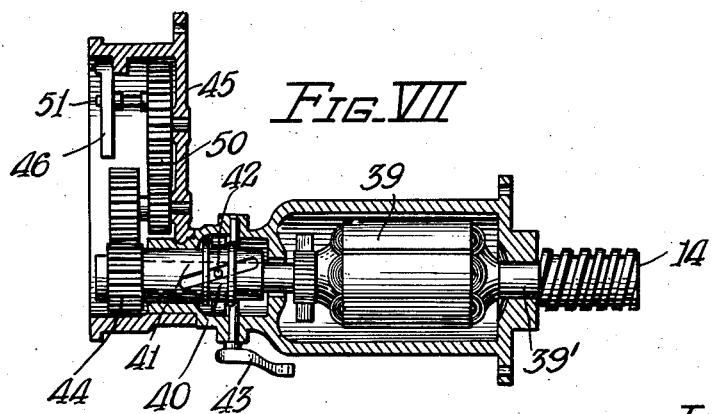
Fig. VII
INVENTOR
Roscoe C. Porter
By Knight Brown
attys Patented May 6, 1941

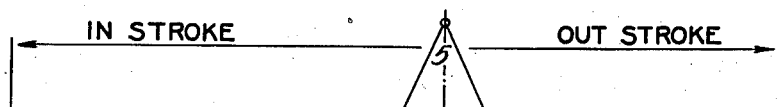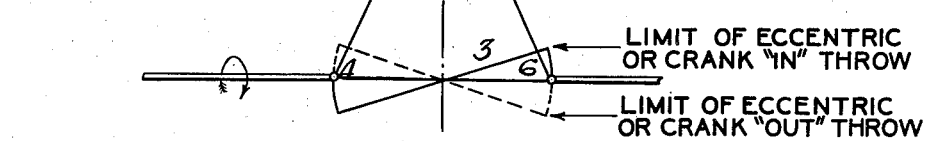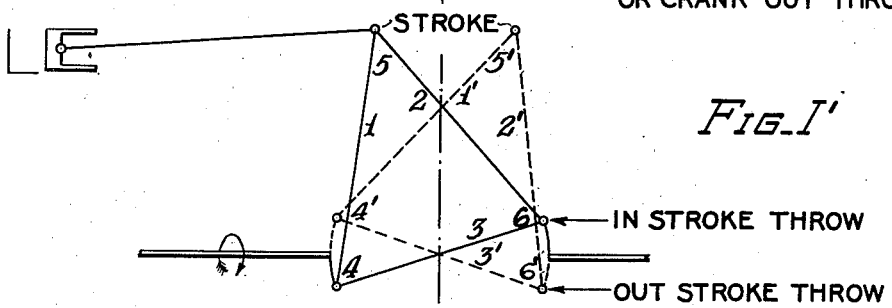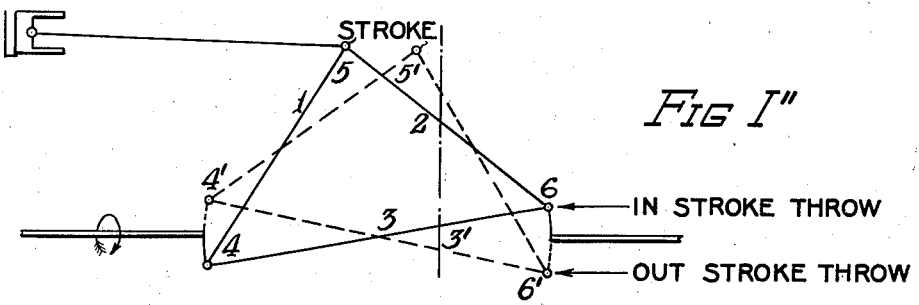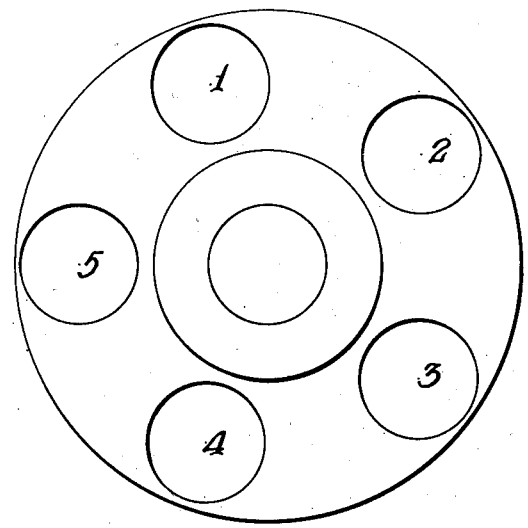

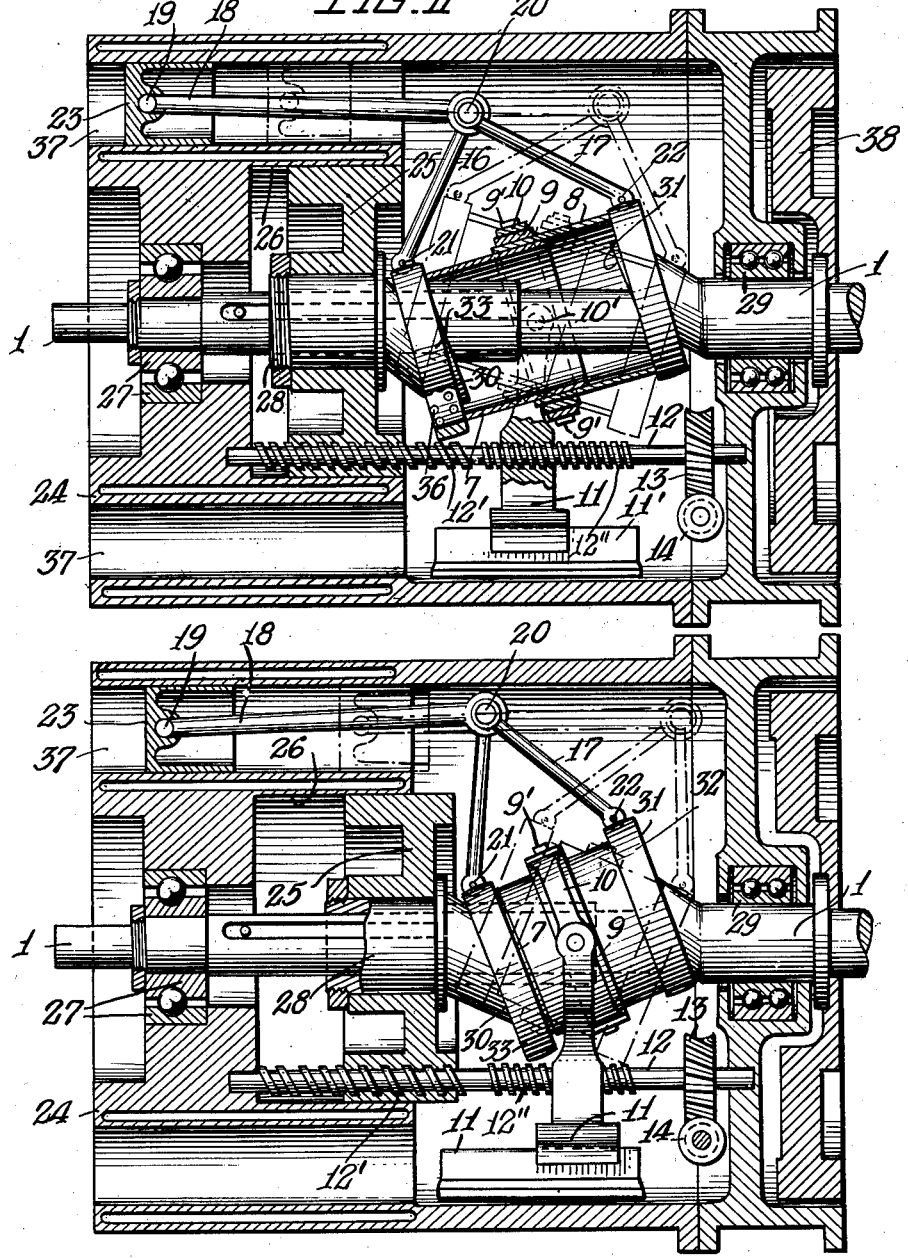

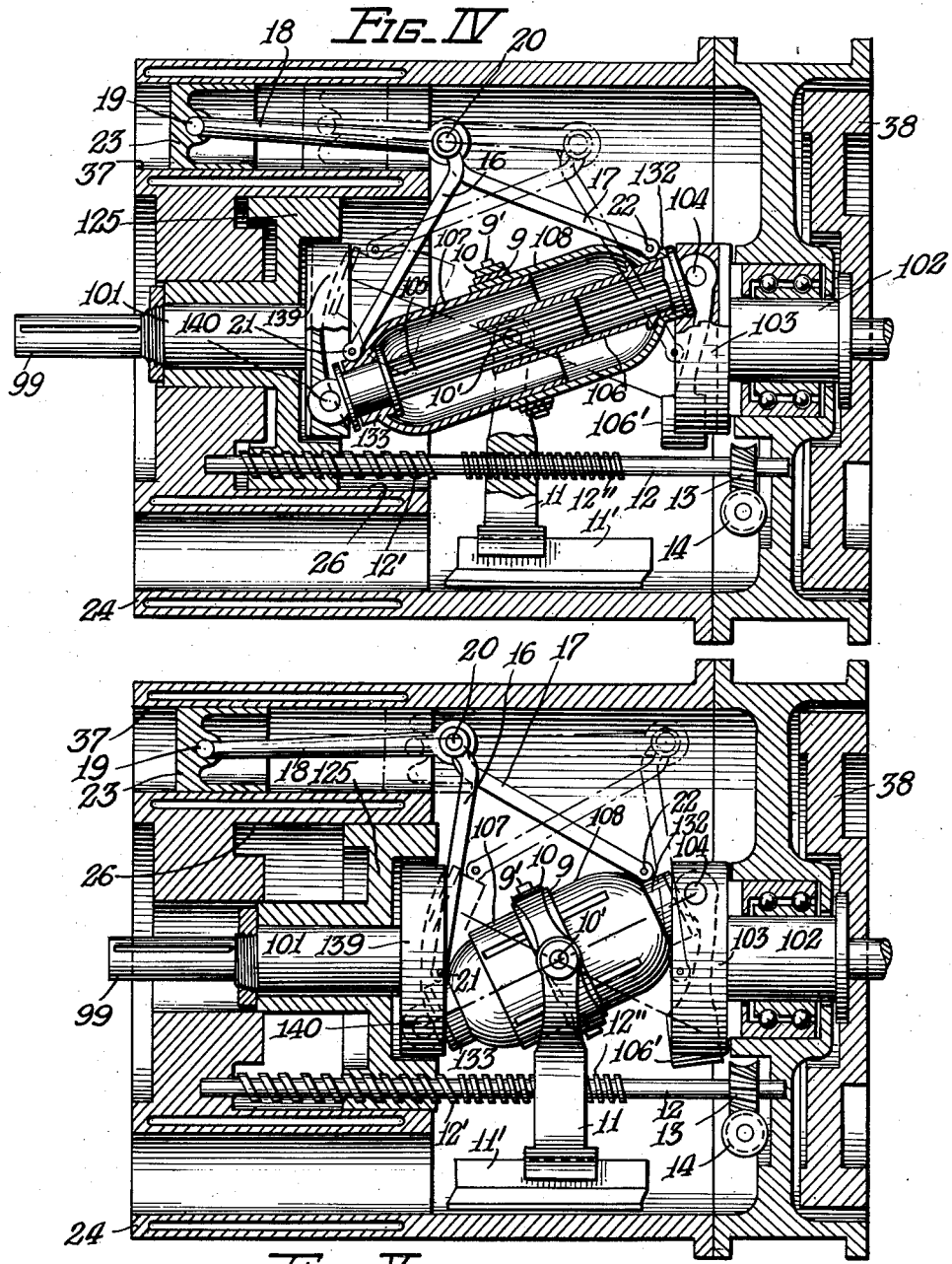

2,240,912

UNITED STATES PATENT OFFICE 2,240,912

POWER TRANSMISSION

Roscoe C. Porter, Long Island City, N. Y.

Application September 25, 1939, Serial No. 296,380

10 Claims. (Cl. 74—60)

This invention relates to eccentric or inclined crank shaft transmissions for engines, pumps, compressors, valve gearing, etc., whereby reciprocating motion is transformed into rotary motion or vice versa. Usually the reciprocating and rotating members will lie in the same plane.

This application is a continuation-in-part of my copending application filed November 8, 1938, Serial No. 239,445.

The primary object of this invention is to provide a transmission mechanism that will enable an engine, pump or other machine to be easily controlled or governed and capable of handling efficiently some 100% overload, and permit high speed without uncontrolled or excessive vibration.

A further object is to provide improved means for effecting controlled, substantially constant, or inverse compression, and variable stroke in internal combustion engines or other machines involving reciprocatory motion and compression of gases.

Fundamentally, the invention comprises two eccentrics or crank arms, disposed diametrically opposite on a shaft and separated longitudinally. Preferably, the minimum separation is slightly more than the maximum stroke of the mechanism. One of these eccentrics or crank arms is slidable in a longitudinal direction away from or toward its innermost position without changing its phase relationship to the other eccentric or crank arm. The second eccentric or crank arm may be slid longitudinally a small amount for a purpose to be explained later.

Each eccentric or crank arm has mounted upon it a bearing housing which has on its outer surface means for making pivotal connections. The bearing housings also have overlapping sleeves with splines or their equivalents that lock the bearing housings into phase relationship with each other and yet permit longitudinal movement. The bearing housings are also provided with means for preventing them from rotating.

The bearing housings are respectively connected, at selected pivot positions, to a plurality of pairs of push-pull arms or bars, each pair having its outer ends connected by a pivotal joint. This constitutes, when one regards the line between the two eccentrics or cranks as the base, a triangular linkage having at least three pivotal joints and is susceptible of many variations of form and application, based upon the laws of the angle or triangle.

In the drawings:

Figures I, I', I", are diagrammatic sketches of the triangular linkage referred to above, as applied to longitudinally spaced eccentrics or crank arms on a rotatable shaft;

Figure II is a longitudinal section of an internal combustion engine incorporating a transmission according to the invention, showing the bearing housings in extended relation with portions of the housings in section;

Figure III is a section similar to Figure II but showing the housings in close relation and in elevation;

Figures IV and V are longitudinal sections, corresponding respectively with Figures II and III, of a modified form of the invention;

Figures VI and VII show an electric motor and attachments constituting a servo-mechanism operating, in the instance shown, as a phase changer and timing device for internal combustion engines. Figure VI is a longitudinal section through the motor and Figure VII is a side elevation showing the servo-mechanism applied to an internal combustion engine; and Figure VIII is a diagrammatic plan of the engines shown in Figures II through V, comprising a plurality of annularly disposed cylinders.

Referring to Figures I, I', I", Figure I represents the mid-stroke position of the triangle when the eccentrics or crank arms are in their closest relation or maximum stroke position; Figure I' represents the maximum in-stroke position in solid lines and the maximum out-stroke in dotted lines; Figure I" represents this same triangular linkage with the base line 3 increased by sliding the inner eccentric or crank arm longitudinally in the direction of the in-stroke position. The increasing of the base line 3 is made possible by the angular movement of the pivot joints 4, 5, 6.

For the purpose of explaining the variation of the longitudinal movement of the apex of the triangle at 5 one may consider one of the base supports (eccentric or crank arm) as fixed; then the base line 3 may be conceived as a lever actuated by the other eccentric or crank. Since in this mechanism the eccentric or crank arms have a constant throw, the shortening of the base will increase the travel of the apex 5, which is at an angle to the fulcrum, as in a bell crank. Conversely the lengthening of the base reduces the longitudinal travel of the apex at 5.

Actually, in the embodiments shown in Figures II through V, the eccentrics or crank arms are diametrically opposed and the fulcrum shifts or rocks in effect, so that the movement is dissimilar to that of a pendulum with its fixed pivot.

All, or practically all, of the sliding movement in widening base 3 of the triangle is done by the eccentric or crank arm on the in-stroke side of this assembly. Therefore the apex at joint 5 of the triangle is moved in the longitudinal direction of the in-stroke an amount equal to or slightly more than half of that travel lost by the widening of the base 3. These functions are reversed if the base 3 is reduced. This gives, in effect, a mechanism that shortens or lengthens its stroke from its out-stroke end.

Compensation in the ratio between the stroke variation caused by widening or narrowing the base of the triangle and the forward or backward movement of the apex at joint 5 by moving one eccentric or crank arm, may be reached in several ways if required for special use such as moving the second eccentric or crank arm a small amount, or by shifting the point of power take-off or application away from the true apex of the triangle, such as by putting an extension on rod or arm 1 or by making arms 1 and 2 of different lengths, or employing eccentrics or crank arms of different throws, or crossing the arms 1 and 2.

The application of the invention to an internal combustion engine wherein the cylinders are parallel with the crank or power shaft, or do not vary from parallelism by more than say 35°, will now be described. Two such embodiments are shown in Figures II–III and Figures IV–V. The cylinders may be arranged in a circle, using any suitable spacing and any suitable number of cylinders (see Figure VIII in which five cylinders are indicated). The pistons, rings, rods, valves, lubricating system, etc., may be of any conventional or suitable construction and perform their normal functions as in a conventional engine.

The oscillating movement of the pistons is translated into rotary motion of the power shaft by means of eccentrics or crank arms connected with rocking angles as herein described.

The engine is preferably designed for a normal short stroke having just sufficient piston displacement or power to carry its standard average load. If an overload is encountered means are provided for longitudinally shifting the in-stroke eccentric or crank arm so that the outer part of the piston stroke can be increased up to some 100% without adversely affecting the inner part of the stroke or the engine's compression ratio.

If different compression ratios are desired from those inherent, compensation is obtainable in the design so that a more suitable compression ratio is secured from the shortest to the longest stroke, thereby greatly increasing the efficiency of the engine, particularly at the lighter loads. Modifications of design, which effect such compensation, have been previously described.

The means for shifting the in-stroke eccentric or crank arm may consist of an oil, vacuum or electric motor, or manual means, operating through worm screws or other suitable means. This shift-actuating means may be controlled by the operator or by the governor through the medium of a servo-mechanism affected by the throttle or control; and one or more other characteristics or secondary functions of the engine may be combined with the throttle or control movement in the servo-mechanism. Such characteristics or secondary functions referred to are, for example, the depression in the induction system or the tendency of an engine to rotate in its supports (if yieldable), either in the direction of its shaft's rotation or oppositely, depending on whether or not the engine is developing more power than its internal friction.

Since the engine's vacuum, as well as its turning movements, are, in a variable stroke engine, controlled by numerous factors, such as the engine's stroke, speed, load, friction, throttle, position, power developed, mixture, ratio timing, as well as ring and valve leakage, barometric pressure, etc., it can be seen that the stroke from its normal standard position to the overload stroke position as well as the overrunning or coasting stroke will vary with all factors. Several of these factors will have influenced the servo-mechanism through the vacuum and turning movements, at the time or before the operator or governor changes the throttle or control.

The combination in the servo-mechanism of these factors is used in order to prevent the engine racing with full stroke when little or no work is being done; also to secure the better economy of the short normal load stroke when the engine is idling or pulling its standard load; further to secure the shortest practical stroke only when the load is overrunning the engine's speed as in coasting on decelerating, so as to reduce friction and give a free wheeling effect.

Referring to the embodiment shown in Figures II–III, wherein an eccentric engine is shown, Figure II shows normal load positions while Figure III shows overload positions with long stroke. Engine block 24 is provided with a central bore for power or eccentric shaft 1 and a circular series of cylindrical bores 37. Any desired number of cylinders may be used but preferably, there should be an odd-numbered plurality if the engine operates on the four-cycle principle.

Each cylinder has a piston 23 and a pitman or connecting rod 18 having ball or equivalent joints 19 and 20. Power shaft 1 is seated in bearings 27, 28, 29. Bearing 28 is axially shiftable, being in the form of a hub extending from the inner eccentric 30, shaft 1 and hub 28 being slidably coupled through straight longitudinal splines on shaft 1. Hub 28 is journalled in a slide 25 which is axially shiftable in large central bore 26. The movable slide 25 is moved forward or backward as required by the worm screw 12 which is turned by the spiral gear 13 which is in turn operated by the worm screw 14 actuated by an electric motor in conjunction with a servo-mechanism, described elsewhere (see Figures VI–VII).

The in-stroke eccentric 30 carries a self-aligning bearing 36 and its bearing housing 33 together with the internal member 7 of a telescoping sleeve 7, 8.

The outer eccentric 31 is secured to the power shaft 1 and is enclosed in its bearing housing 32 which carries a self-aligning bearing such as 36, mentioned above. The outer eccentric bearing housing 32 carries the other member 8 of the telescoping sleeve, members 7 and 8 being held against rotation relative each other, as by splines.

The outer member 8 of the telescoping sleeve has mounted upon it a circular band 9 having internal splines matching external splines on sleeve 8 and band 9 has pivot pins 9' which support a second band 10 with pivots 10' to form a gimbal ring which, in conjunction with the upright movable stop 11 and correctly proportioned threads 12', 12" on the worm screw 12, prevents the sleeves 7, 8 and bearing housings 33, 32 from rotating with the least possible friction, while centering the rocking axis. The base of stop 11 slidingly engages a guide rail 11'.

The in-stroke eccentric bearing housing 33 has provision for making pivotal joints 21 and the out-stroke eccentric bearing housing 32 has similar provisions at 22. An inner arm 16 and outer arm 17 are attached to pivots 21 and 22 respectively, and are attached to each other at or near their outer ends 20. This construction forms a rocking angle and, when the base line, constituted by the housings and sleeves is considered, a triangle is formed to which the connecting rod 18 is attached at or near the apex of the triangle.

Referring now to Figures IV and V, this engine does not differ from the engine shown in Figures II and III except that inclined cranks are used on the power shaft instead of eccentrics. The same triangular linkage is used to vary the piston stroke and to control the compression ratio. Figure IV shows the engine with its normal stroke and compression ratio, Figure V shows the engine adjusted for its long stroke for delivering extra power.

In this engine the inclined crank shaft is assembled of component parts so that the forward or in-stroke part 101 of the shaft can be slid fore or aft as the splined telescoping shafts 105 and 106 extend or collapse. Shaft 106 carries counterweight 106'. The rear portion 102 of the power shaft carries the flywheel 38 and a boss 103 in which pin 104 is eccentrically seated and pivotally joined to shaft 106. Journalled on shafts 105, 106 are bushings 133, 132 from which project splined telescoping sleeves 107, 108 which are in locked phase relationship.

Rearwardly, shaft 101 carries a boss 139 and pin 140 to which is attached shaft 105 telescoping into 106. Forward part 101 of the power shaft carries a splined extension 99 for driving the timing gears (not shown).

In other respects the construction and operation of this embodiment are the same in Figures II and III.

Figures VI and VII show an electric motor carrying the worm screw 14 (shown in Figures II–V) and a somewhat conventional phase changer and electrical timing arrangement, these constituting with other equipment a servo-mechanism.

39 is the motor armature and 39' the shaft. A sleeve with winding slot 41 carries timing gear 44. Collar 40 carrying pin 42 is shifted axially by lever 43. Gear 44 through compounding turns gear 50 which carries pin 51 which in turn swings arm 46 and, through link 47, actuates bell crank 48. This motion closes the switch, whereupon electric current drives the armature 39, either clockwise or anticlockwise according to the direction in which arm 46 is thrown. A balanced condition breaks the circuit and stops the electric motor.

Lever 43 is actuated by the diaphragm piston 52 operated by the depression in the induction system, when the valve 54 is open either because the throttle is opening or the engine is tending to turn in its support. Spring 53 is calibrated and constructed so that when the valve 54 is open a strong vacuum shortens the stroke. A weak vacuum will increase the stroke through the phase changer operating through lever 43.

However, if the throttle is opened until stop 55 forces arm 56 forward, the stroke will be increased materially by swinging the gear housing 45 so that the circuit is made, causing the armature through gear 14 to advance the engine to a longer stroke. If the vacuum in the induction system is at this time low, maximum stroke is obtained. The carburetor 57 should be of the so-called expanding or two or more stage type, although a fuel injection pump of wide range in conjunction with nozzles can be used.

58 is a connection attached to the stem of valve 54 and engine support 59 so that in decelerating or coasting, the tendency of the engine to turn in its supports 59 and 60 opens the valve 54 admitting the abnormally high vacuum and shortening the stroke beyond the engine's normal short stroke.

As applied to internal combustion engines, as hereinbefore described, the invention effects or makes possible various improvements over known engines of the swash- or wobble-plate type. Constant throw of the eccentrics or crank arms and their respective bearing housings and other parts having considerable mass can be achieved. Therefore counter weights can be used to control forces that would tend to create undesirable vibrations.

The eccentric, crank arm or power shaft is turned by two forces diametrically opposite. One force tends to rotate the shaft by a down and outward pressure, the other force by an up and outward pressure, from the center of the shaft. These forces, which are radial to the axis of the engine and directionally opposed, tend to neutralize each other, reducing vibration and shaft deflection.

The triangular linkages have little mass beyond their hubs and do not rotate, therefore, neither their inertia nor gyroscopic effect would seriously interfere with smooth operation at the upper speed ranges.

I claim:

1. Power transmission comprising in combination, a reciprocatory member, a rotary member, convergent rocking arms, means connecting said reciprocatory member to said arms adjacent their convergence to cause said arms to rock in unison with said reciprocatory member, means drivingly connecting each of said arms, respectively, to said rotary member at axially spaced parts of said rotary member, and means for axially shifting at least one of said last-mentioned connecting means to vary the axial distance between said connecting means.

2. Power transmission according to claim 1, in which the axes of the reciprocatory and rotary members are substantially parallel and the rocking arms diverge from their connection with the reciprocatory member in axially opposite directions.

3. Power transmission according to claim 1, in which the means for drivingly connecting at least one of said rocking arms to the rotary member comprises an axially shiftable member keyed to said rotary member.

4. Power transmission comprising in combination, a reciprocatory member, a rotary member, convergent rocking arms, means connecting said reciprocatory member to said arms adjacent their convergence to cause said arms to rock in unison with said reciprocatory member, axially spaced eccentric members carried by said rotary member, at least one of said eccentric members being axially shiftable, means for shifting said shiftable eccentric member, and means drivingly connecting said arms, respectively, with said eccentric members.

5. Power transmission comprising in combination, a reciprocatory member, a rotary member, convergent rocking arms, means connecting said reciprocatory member to said arms adjacent their convergence to cause said arms to rock in unison with said reciprocatory member, axially spaced eccentric members carried by said rotary member, at least one of said eccentric members being axially shiftable, means for shifting said shiftable eccentric member, telescoping sleeves journally associated, respectively, with said eccentric members, and means drivingly connecting said arms, respectively, with said sleeves.

6. Power transmission comprising in combination, a reciprocatory member, a rotary member, convergent rocking arms, means connecting said reciprocatory member to said arms adjacent their convergence to cause said arms to rock in unison with said reciprocatory member, axially spaced eccentric members carried by said rotary member, at least one of said eccentric members being axially shiftable, means for shifting said shiftable eccentric member, telescoping sleeves journally associated, respectively, with said eccentric members, means preventing relative rotation between said sleeves, and means drivingly connecting said arms, respectively, with said sleeves.

7. Power transmission comprising in combination, a reciprocatory member, a rotary member, convergent rocking arms, means connecting said reciprocatory member to said arms adjacent their convergence to cause said arms to rock in unison with said reciprocatory member, axially spaced eccentric members carried by said rotary member, at least one of said eccentric members being axially shiftable, means for shifting said shiftable eccentric member, telescoping sleeves journally associated, respectively, with said eccentric members, means preventing rotation of said sleeves, and means drivingly connecting said arms, respectively, with said sleeves.

8. Power transmission comprising in combination, a reciprocatory member, a rotary member, convergent rocking arms, means connecting said reciprocatory member to said arms adjacent their convergence to cause said arms to rock in unison with said reciprocatory member, axially spaced eccentric members carried by said rotary member, at least one of said eccentric members being axially shiftable, means for shifting said shiftable eccentric member, telescoping sleeves journally associated, respectively, with said eccentric members, means preventing rotation of said sleeves, and means drivingly connecting said arms, respectively, with said sleeves, said means for preventing rotation of said sleeves comprising a member keyed to said sleeves and rocking therewith, and means responsive to the means for shifting said eccentric member for shifting said keyed member with the rocking axis of said sleeves as the sleeves extend or collapse.

9. Power transmission comprising in combination, a reciprocatory member, a rotary member, convergent rocking arms, means connecting said reciprocatory member to said arms adjacent their convergence to cause said arms to rock in unison with said reciprocatory member, axially spaced eccentric members carried by said rotary member, at least one of said eccentric members being axially shiftable, means drivingly connecting said arms, respectively, with said eccentric members, and means for shifting said shiftable eccentric member, said shifting means comprising a member which shifts with said shiftable eccentric member and has worm-engaging means, a worm, and means for actuating said worm.

10. Power transmission comprising in combination, a reciprocatory member, a rotary member, convergent rocking arms, means connecting said reciprocatory member to said arms adjacent their convergence to cause said arms to rock in unison with said reciprocatory member, means drivingly connecting each of said arms, respectively, to said rotary member at axially spaced parts of said rotary member, and means responsive to a fluctuating operating characteristic of the power system for axially shifting at least one of said last-mentioned connecting means to vary the axial distance between said connecting means.

ROSCOE C. PORTER.